Oct. 14, 1969 E. G. OLSON 3,473,055

CONDITION RESPONSIVE D.C. POWER SUPPLY SWITCH

Filed Jan. 30, 1967

INVENTOR.
EDWARD G. OLSON
BY
[signature]
ATTORNEY

United States Patent Office 3,473,055

Patented Oct. 14, 1969

3,473,055
CONDITION RESPONSIVE D.C. POWER SUPPLY SWITCH

Edward G. Olson, Doylestown, Pa., assignor to the United States of America as represented by the Secretary of the Navy Filed Jan. 30, 1967, Ser. No. 613,075
Int. Cl. H03k *3/26*
U.S. Cl. 307—305 10 Claims

ABSTRACT OF THE DISCLOSURE

An audio activated D.C. power supply switch having a threshold device responsive to the audio output of a microphone for providing a control signal voltage which will at selected levels turn on and turn off an SCR power switch by causing the breakdown of a selected one of a pair of breakdown diodes.

The invention described herein may be manufactured and used by or for the Government of the United States of America for governmental purposes without the payment of any royalties thereon or therefor.

BACKGROUND OF INVENTION

Known condition responsive switches for interconnecting a selected load with a power supply have been found to be unsatisfactory especially in a battery operated environment because of the relatively large current drains inherent in the construction of the devices. Some devices include elements which are too large for configuration in small packages, while others include quite expensive elements. Further, the maximum currents which may be supplied by such devices imposes unsatisfactory limitations on the types of loads desirably actuated by such a switch.

SUMMARY OF INVENTION

It is a general purpose of this invention to provide an inexpensive condition responsive D.C. power switch which draws from its D.C. power supply an insignificant current drain during times when it is desirable that its load be disconnected from the power supply and, further, when actuated has a capability for providing relatively large currents to selected loads therefor. Briefly, this is accomplished by providing a condition responsive threshold device which includes a normally operating modified, single stage amplifier which has a diode feedback circuit for changing the quiescent operating point of the transistor thereof to supply a switch control output signal in response to a threshold exceeding, A.C. signal supplied by a condition responsive detector and by providing a controllable power switch which includes a pair of breakdown diodes, one of which functions upon its breakdown to pulse the gate of a power supply connected SCR, turning it ON and the other of which functions upon its breakdown to pass a voltage which is applied to the cathode of the SCR, turning it OFF.

DETAILED DESCRIPTION OF PREFERRED EMBODIMENTS

Figure 1:
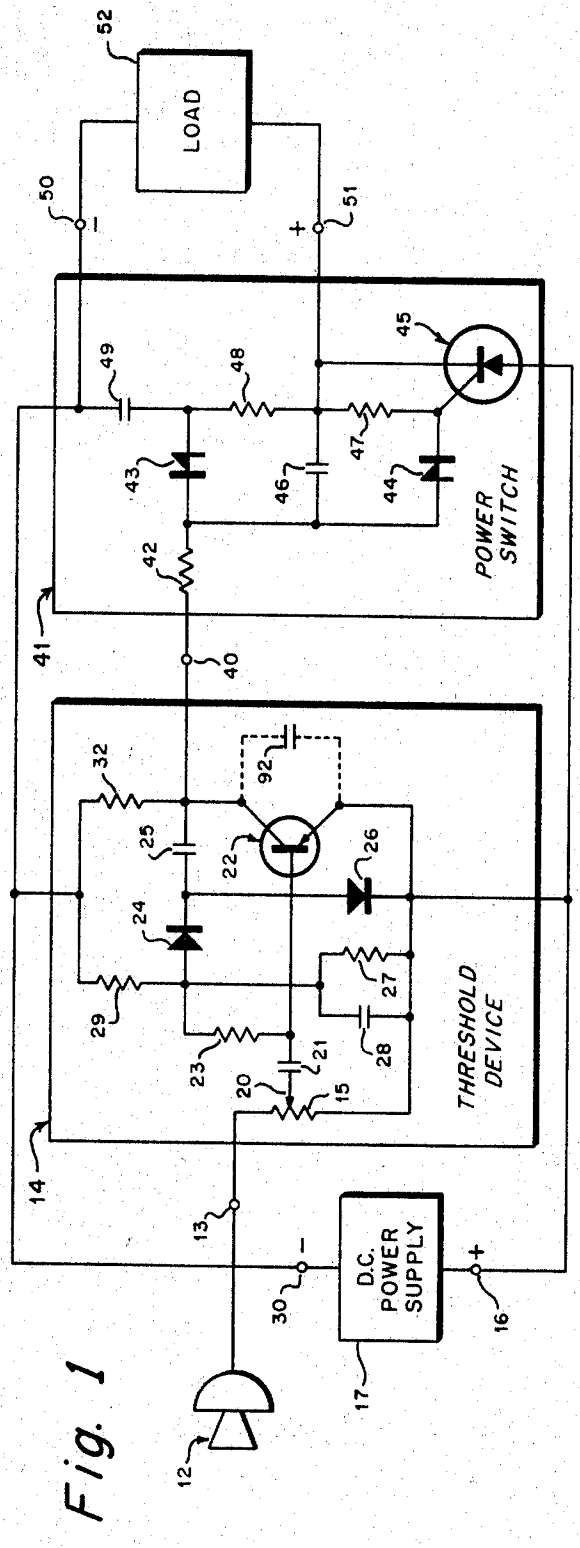
FIG. 1 is a schematic diagram of an embodiment of audio activated switch according to the invention including a controllable power switch.

Referring now to FIG. 1, the A.C. output of a microphone 12, which functions as a detection device, is fed to an input terminal 13 of a threshold device 14, which terminal 13 is connected through a potentiometer resistor 15 to a positive output terminal 16 of a D.C. power supply 17 such as a battery. A potentiometer wiper arm 20 associated with resistor 15 is coupled through a capacitor 21 both to the base of a PNP transistor 22 and also through a resistor 23 to the anode of a diode 24. The cathode of the diode 24 is connected at a junction both through a capacitor 25 to the collector of the transistor 22 and also to the anode of a second diode 26 whose cathode is connected to the positive terminal 16 along with the emitter of transistor 22. A resistor 27 and a capacitor 28 are parallelly connected between the cathode of diode 26 and the anode of diode 24 which, in turn, is connected through a large resistor 29 to a negative output terminal 30 of the D.C. power supply 17. The collector of the transistor 22 is also connected through a resistor 32 to the negative terminal 30.

The values of the resistors 27 and 29 are so chosen that a voltage of suitable magnitude to maintain the transistor 22 in a slight state of conduction is applied through the resistor 23 to the base thereof. Thus, when the A.C. output of the microphone 12 is applied to the base of the transistor 22 through the capacitor 21, an amplification thereof occurs which appears at the collector of the transistor 22 and over the resistor 32 and is passed by the capacitor 25 to the junction of the diodes 24 and 26. The positive portion of the amplified A.C. signal causes the diode 26 to conduct and the negative portion of the amplified A.C. signal causes the diode 24 to conduct. When diode 24 conducts, a current flows through resistor 27, diode 24 and resistor 32 causing a voltage drop across resistor 27. This causes the potential at the junction of the resistors 29 and 27 and 23 to become more negative with respect to that at terminal 16. The decrease in potential is applied through resistor 23 to the base of the transistor 22 causing the transistor 22 to conduct more current. In this way, the output potential appearing across resistor 32 at the collector of the transistor 22 is caused to rise to a required control signal level. The voltage drop across the resistor 27 is effectively algebraically added to the potential at the transistor collector and is applied to the base of the transistor as a base bias in order to establish a new quiescent operating point for the transistor.

When the microphone ceases to provide an A.C. output, the diodes 24 and 26 no longer function to bias the base of transistor 22 more negatively; and conduction by the transistor drops off, causing the output signal appearing across resistor 32 at the collector to drop off.

Of course the wiper arm 20 may be adjusted to adjust that level of A.C. output from the microphone 12 which will cause the collector potential to rise to a selected switch control level, hereinafter to be more fully indicated. The capacitor 28 functions to permit selectivity between a sustained audio input which will cause desirable activation of the threshold device 14 and intermittent sounds which would undesirably cause activation of the threshold device 14. Of course, the capacitor 28 increases the times for the device 14 to provide and also to cease to provide the desired output signal. Thereby, the threshold device 14 quickly functions to provide a switch control output signal of a selected magnitude across the resistor 32 when the signal from the microphone 12 exceeds a selectively set minimum threshold level.

The switch control output signal of the threshold device 14 is applied to a control input terminal 40 of a power switch 41. The terminal 40 is connected through a resistor 42 both to the cathode of a first four-layer PNPN breakdown diode 43 and also to the anode of a second four-layer breakdown PNPN diode 44. The cathode of the breakdown diode 44 is connected to the gate of a SCR (silicon controlled rectifier) 45 of the type which may be turned off by limiting the current flow therethrough which type is to be distinguished from the much more expensive gate turnoff type of a controllable rectifier device. The anode of the SCR 45 is connected to the positive terminal 16, and the cathode thereof is connected through a capacitor 46 to the junction between the resistor 42 and the diodes 43 and 44. A resistor 47 is connected between the gate of the SCR 45 and its cathode in order to protect the SCR 45. The anode of breakdown diode 43 is connected through a resistor 48 to the cathode of the SCR 45 and is coupled through a capacitor 49 to the negative terminal 30 which, in turn, is also connected to a negative output terminal 50 of the switch 41. The cathode of the SCR 45 is connected to a positive output terminal 51 of the switch 41. A suitable load 52 such as a transmitting device or an alarm device is connected across the switch output terminals 50 and 51.

Consequently, when the threshold device 14 provides the switch input terminal 40 with the selected switch control voltage which exceeds the forward breakdown voltage of the diode 44, the diode 44 conducts; and a pulse is applied to the gate of SCR 45 which turns the SCR ON enabling current to flow through the load 52. The supply voltage effectively appears at the cathode of the SCR when it turns on, and capacitor 49 begins to charge by way of resistor 48.

When the A.C. output from the microphone 12 ceases, the switch control voltage provided by the threshold device 14 drops eventually to a level which when subtracted from the SCR cathode voltage appearing on capacitor 49 is equal to the forward breakover voltage of the breakdown diode 43. The diode 43 thereby is caused to conduct, and a voltage drop appears over resistors 42 and 32. Thereby, the voltage appearing across capacitor 49 is, in effect, applied to the capacitor 46. Since neither of the capacitors 46 and 49 can change its state instantaneously, the increase in voltage at the common junction of capacitor 46, diode 43 and resistor 42 is applied to the cathode of the SCR 45 which increase causes the current therethrough to decrease below the minimum required holding current therefor and activates the turning OFF of the SCR 45 so that the voltage across the load 52 is removed.

Figure 3:
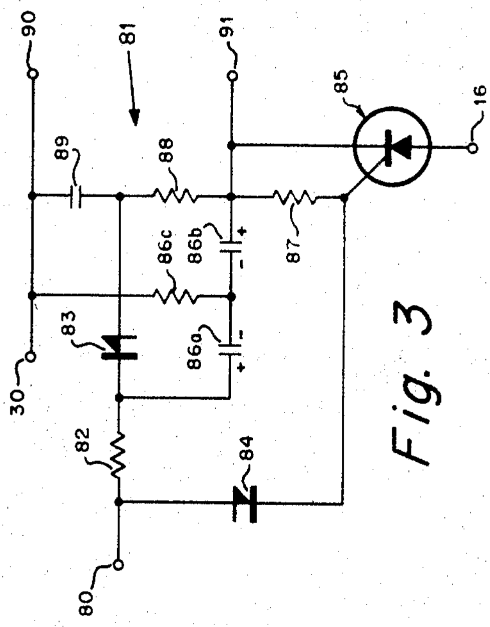
FIG. 3 is a schematic diagram of a further modified power switch.
Figure 2:
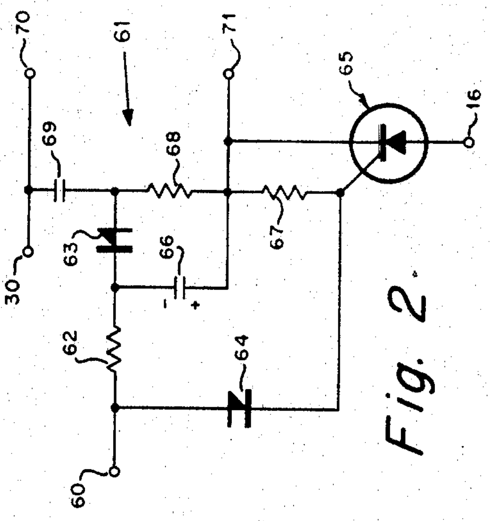
FIG. 2 is a schematic diagram of a modified power switch.

FIGS. 2 and 3 show modified forms of the power switch 41 which differ in accordance with the sorts of capacitors available for use in the circuit as capacitor 46 and also upon the desired size of the switch circuitry. For example, as shown in FIG. 1, capacitor 46 is most conveniently of the nonpolarized type. If the size of the final circuitry is a factor, it is also possible to use a polarized capacitor able to withstand a small reverse bias and having a high internal impedance with no significant decrease thereof during conduction.

In FIG. 2, wherein the last digit in the numeration of the elements is the same as those for the corresponding elements of the switch 41, the switch 61 has a similar arrangement to that of switch 41 and has the anode of its first four-layer breakdown PNPN diode 64 connected, not to the capacitor 66 as in FIG. 1, but to the side of the resistor 62 connected to the control input signal terminal 60. This circuit is suitable for use when a polarized capacitor which is able to withstand a small reverse bias, such as the tantalum type, is available. This circuitry functions in the same manner as switch 41 to selectively provide a D.C. voltage at its output terminals 70 and 71, can be fabricated at a lesser expense and can be made to have a smaller physical size than can the circuit of switch 41 in FIG. 1. This circuit is also particularly useful when the internal impedance of the available capacitor 66 is low.

In FIG. 3, wherein the last digit in the numeration of the elements is the same as those for the corresponding elements of the switch 61 in FIG. 2, the switch 81 is quite similar to the switch 61 except that the equivalent for the capacitor 66 is a pair of polarized capacitors 86*a* and 86*b* whose negative sides are connected together and through a resistor 86*c* to the negative terminal 30. This circuit is particularly useful when the available capacitors cannot withstand any reverse bias. The resistor 86*c* functions to protect the capacitors 86*a* and 86*b* against a reverse bias. The switch 81 functions in the same manner as the switch 41 to provide at its output terminals 90 and 91 a suitable D.C. voltage for driving a load upon the receipt of the suitable switch control signal at its input terminal 80 from the threshold device 14. A control voltage of suitable magnitude causes the diode 84 to break down, turning on SCR 85. The SCR 85 is turned off in the same manner as is the switch 41 in that the diode 83 breaks down and enables an application by capacitors 86*a* and 86*b* of an increase voltage to the cathode of the SCR 85.

It has been found that a high level of radiated RF which may occur as when the load 52 is a transmitter may cause the threshold device 14 to constantly provide that switch control signal of a suitable level to keep the switch associated therewith turned ON. Hence, it may be desirable to utilize a capacitor 92 connected between the collector and the emitter of the transistor 22 as indicated in dotted lines in FIG. 1. This capacitor also functions to provide audio roll off and may be used to reduce sensitivity of the device to frequencies above a selected level.

It is contemplated that the apparatus described above may be used with other condition responsive devices than the microphone 12 disclosed. The foregoing disclosure describes apparatus which is useful for incorporation into many devices such as intrusion detection devices. For example, the sensitivity of the threshold device 14 can be adjusted so as to detect a sustained audio input as when a human intruder breaks into a building. The power switch 41 when activated thereby may be utilized to turn on a variety of loads 52 and supply large amounts of current thereto. For example, the load could comprise a transmitter which would, when turned on, signal a remote receiving station that an intrusion has occurred.

The threshold device 14 draws such a small current that batteries may be conveniently used to power the entire apparatus. For example, a threshold device 14 has been constructed which draws from a 15-volt battery a current in the range of only 150 microamperes. A current drain this small does not significantly decrease the life of the battery to which it is connected below the ordinary shelf life thereof.

It should be understood, of course, that the foregoing disclosure relates only to preferred embodiments of the invention and that numerous modifications or alterations may be made without departing from the spirit and scope of the invention as set forth in the appended claims.

What is claimed is:

1. Apparatus comprising:

condition responsive means for detecting a selected condition and providing at its output a control signal;

a first breakdown diode having its anode connected to said condition responsive means for receiving said control signal;

a second breakdown diode having its cathode connected to said condition responsive means for receiving said control signal;

a silicon controlled rectifier having one of its anode or cathode terminals adapted for connection to a power supply and having its gate connected to the cathode of said first breakdown diode, said rectifier being of the type which is caused to turn ON by a voltage applied to its gate and is caused to turn OFF only by reducing the current flow therethrough to a level below the minimal required holding current therefor, the output signal of said apparatus appearing at the other of the anode or cathode terminals of said rectifier;

capacitor means connected between the cathode of said second breakdown diode and said other of said anode or cathode terminals of said rectifier;

said control signal having a first voltage of a first level sufficient to cause said first breakdown diode to conduct and to cause said rectifier to turn ON when the condition is being detected and having a second voltage of a second level sufficient to cause said second breakdown diode to conduct when a condition which was being detected by said condition responsive means thereafter becomes undetectable thereby; and means for applying a third voltage to the anode of said second breakdown diode, said third voltage being of a level sufficient to cause said rectifier to turn OFF upon conduction by said second breakdown diode.

2. Apparatus according to claim 1 wherein said means for applying said third voltage to the anode of said second breakdown diode includes:

a resistor connected between the anode of said second breakdown diode and said other of the anode or cathode terminals of said rectifier; and a capacitor connected between a source of reference potential and the anode of said second breakdown diode.

3. Apparatus according to claim 2 wherein:

the anode of said first breakdown diode is directly connected to the junction between said capacitor means and the cathode of said second breakdown diode.

4. Apparatus according to claim 2 further comprising:

a resistor connected between said output of said condition responsive means and the junction of said capacitor means and the cathode of said second breakdown diode; and wherein said anode of said first breakdown diode is connected with said junction through said resistor.

5. Apparatus according to claim 2 wherein said capacitor means includes:

a pair of polarized capacitors having their negative sides interconnected at a junction and their positive sides connected to a respective one of the cathode of said second breakdown diode and said other of the anode or cathode terminals of said rectifier; and a resistor having one side connected to said junction between said polarized capacitors and the other side connected to a source of reference potential.

6. Apparatus according to claim 5 further comprising:

a resistor connected between said output of said condition responsive means and the junction between one of said polarized capacitors and the cathode of said second breakdown diode; and wherein said anode of said first breakdown diode is connected to the last said junction through said resistor.

7. Apparatus according to claim 1 wherein said condition responsive means providing said control signal includes:

amplifier means including a transistor having a collector connected to said output of said condition responsive means;

means connected to said transistor for maintaining said transistor in at least a slight state of conduction;

condition detection means connected to said base for providing thereto an A.C. signal indicative of the condition being detected; and feedback means coupled to the collector of said transistor for applying the amplified A.C. signal there appearing to the base of said transistor for changing the quiescent operating point thereof and for causing said transistor to conduct more current.

8. Apparatus according to claim 7 wherein said feedback means includes:

a first diode having an anode connected to the base of said transistor;

a first source of reference potential;

a second diode having an anode connected to the cathode of said first diode and having a cathode connected to said first source of reference potential;

a resistor interconnected between the anode of said first diode and said first source of reference potential; and a capacitor interconnected between the collector of said transistor and the junction between said first and second diodes.

9. Apparatus according to claim 8 wherein said means for applying said first voltage to said anode of said second breakdown diode includes:

a resistor connected between said anode of said second breakdown diode and said other of the anode or cathode terminals of said rectifier;

a second source of reference potential;

a capacitor connected between said second source of reference potential and said anode of said second breakdown diode;

said apparatus further comprising:

a resistor connected between said output of said condition responsive means and the junction of said capacitor means and said cathode of said second breakdown diode; and wherein said anode of said first breakdown diode is connected to the last said junction through said transistor.

10. Apparatus according to claim 9 wherein said condition detection means includes:

a microphone.

References Cited

UNITED STATES PATENTS

| | | | |
|---|---|---|---|
| 3,215,950 | 11/1965 | Reiner | 307—305 |
| 3,335,291 | 8/1967 | Gutzwiller | 307—305 |

ARTHUR GAUSS, Primary Examiner

H. A. DIXON, Assistant Examiner

U.S. Cl. X.R.

307—235, 324